Nov. 17, 1970 HIDEYA NISHIOKA 3,541,510

SCANNING METHOD AND SYSTEM FOR RECOGNIZING LEGIBLE CHARACTERS

Filed March 14, 1966 4 Sheets-Sheet 1

Nov. 17, 1970 HIDEYA NISHIOKA 3,541,510

SCANNING METHOD AND SYSTEM FOR RECOGNIZING LEGIBLE CHARACTERS

Filed March 14, 1966 4 Sheets-Sheet 2

SCANNING METHOD AND SYSTEM FOR RECOGNIZING LEGIBLE CHARACTERS

Filed March 14, 1966 4 Sheets-Sheet 4

United States Patent Office 3,541,510

Patented Nov. 17, 1970

3,541,510

SCANNING METHOD AND SYSTEM FOR RECOGNIZING LEGIBLE CHARACTERS

Hideya Nishioka, Kawasaki-shi, Japan, assignor to Fujitsu Limited, Kawasaki, Japan, a corporation of Japan Filed Mar. 14, 1966, Ser. No. 533,981

Claims priority, application Japan, Mar. 18, 1965, 40/15,994

Int. Cl. G06k *9/16*

U.S. Cl. 340—146.3 1 Claim

ABSTRACT OF THE DISCLOSURE

A scanner in a recognition system for continuous line characters is controlled to sweep a loop-shaped path of larger width than the character line element so that each individual sweep passes across opposite edges of such portions and the scanner produces time-spaced black and white output signals. A tracking control circuit responds to the signals from the scanner and in turn shifts the loop-shaped sweep path of the character to track such character.

DESCRIPTION OF THE INVENTION

My invention relates to systems for recognizing alphabetic, numerical or other symbolic characters.

Such systems, as hitherto employed, are predicated upon the principle of dividing the image of the character to be recognized into many small segments. The character elements in all of these segments are quantized by an optical-electrical system and converted to binary signals. The resulting quantized signal patterns are compared with separately prepared standard patterns of the respective characters, and only those which correspond to a standard pattern are recognized as a readable character. Since in such a digital system the recognition of a character depends upon compliance of its digital pattern with certain logical conditions, the character pattern and size must strictly conform to fixed requirements and, for response to printed characters, the inking condition is considerably restricted as to printing quality.

For this reason, a special printing device or type font is needed to prepare the medium for reading, and special care must be observed when handling the medium in the recognition system. To avoid faulty reading, the logical conditions for proper recognition inevitably become quite complex, requiring intricate and expensive system equipments.

An analog character recognition system is simpler in design. However, since the conventional analog system functions by responding to partial characteristics of the printed character for comparison with separately prepared standard patterns, this system of character recognition has the same shortcomings as the above-mentioned digital system, in that the type and size of the characters, as well as the printing quality, are considerably restricted.

It is, therefore, an object of my invention to devise optical-electrical scanning methods and apparatus for character recognition that impose fewer restrictions on the character read-out patterns and the printed character quality than the known recognition system.

To this end, and in accordance with my invention, the characters to be recognized are scanned by a cyclical sweep on a circular or other loop-shaped path whose diameter or width is larger than the elemental line portion of the character being scanned at a time. During each sweep cycle such a loop-shaped sweep repeatedly passes across the edges of the character line element being scanned, each time resulting in the issuance of a "black" or "white" scanner signal, depending upon whether the scanning point passes onto the printed or written representation of the character or onto the background respectively. Furthermore, according to a conjoint feature of my invention, I simultaneously impart to the sweep loop a shifting motion parallel or tangential to the edges of the character, thus tracking the character from one end to the other as its area elements are being subjected to loop scanning.

The above-mentioned black and white signals occur at respective moments of different time spacing from the starting point of the individual sweep cycle. According to still another feature of my invention, these respective time intervals are converted into time-proportional magnitudes from which the required tracking direction is computed by logic circuit components which in turn control the above-described tracking travel of the scanning loop.

According to a further feature of my invention, the changes in tracking direction versus time thus produced by the above-mentioned logic circuitry result in respective wave configurations or patterns which are unique for each of the respective characters and consequently are available for identifying the characters.

The invention will be further described with reference to an embodiment of a character recognition system according to the invention illustrated by way of example in the accompanying drawings, in which:

FIG. 1*a* is an explanatory diagram showing the relation of a circular scanning sweep to a character being scanned; FIG. 1*b* is an enlarged portion of FIG. 1*a* and represents angular relations essential to understanding the invention; and FIG. 1*c* is a voltage-time graph exemplifying the black and white scanning signals issuing during one cycle of a scanning sweep as represented by FIGS. 1*a* and 1*b;*

FIG. 2 exemplifies for the numerical characters "1" to "0" the corresponding wave patterns, each representing changes in tracking direction versus time;

Figure 1A:
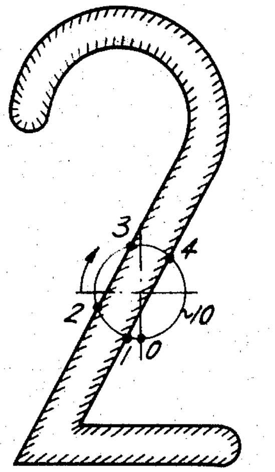
Figure 1B:
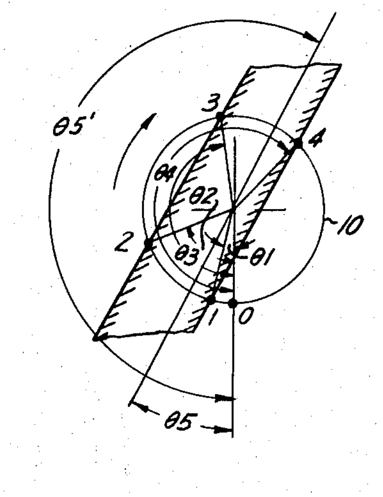
Figure 1C:
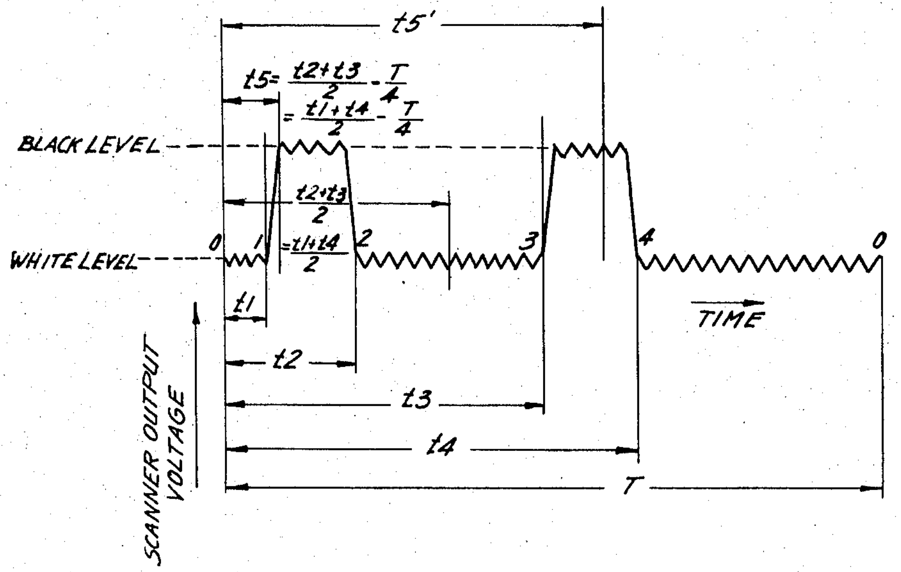

Referring first to FIGS. 1*a*, 1*b*, 1*c*, there is shown an example of the character scanning method for the character "2," the imprint (black) zone being identified by diagonal hatch lines. The scanning point sweeps at constant peripheral speed along a circle 10, whose diameter is greater than the width of the printed zone. The time required for the circular sweep to reach the edges of the imprint at points 1, 2, 3 and 4 after the sweep has started, is detected for each arrival; the resultant time is used to determine the direction of both edges of the printed zone; and in this way, the center of the sweep circle is controlled to move along both edges of the printed zone.

Many systems are applicable for performing such a scanning sweep. Described presently, however, is a preferred system in which, as in well-known TV camera tubes, a multitude of photoelectric elements, arranged on a planar light-sensitive surface, receive an optical image and are scanned by the sweep of an electron beam. In such an optical-electrical converting system, the above-mentioned circular sweep is performed by deflecting the electron beam so as to cause the scanning point, i.e. the point of incidence on the image plane, to rotate on a circle at constant peripheral speed. As long as the image of the printed part is being scanned by the beam projected onto the light-sensitive surface, the output current is at what is generally called "black" level. As long as the unprinted background is being scanned, the output current is at what is generally called "white" level. The sweep starts from point 0 as shown in FIG. 1*a*, the sweeping beam rotating counterclockwise as shown by an arrow. The scanner output voltage is at the "black" level for the printed part and at the "white" level for the background. This is shown in FIG. 1*c*.

In FIG. 1*c*, T denotes the sweep period, i.e. the time required for sweeping one complete scan along the circumference 10 through points 0–1–2–3–4–0 (FIG. 1*b*). The interval $t_1$ denotes the time required for the scanning point to reach the first edge at point 1 of the printed part from point 0 at which the sweep is started; $t_2$ denotes the time required to reach the other edge of the printed part at point 2, also starting from point 0; $t_3$ denotes the time in which the sweep travels from point 0 to point 3; and $t_4$ denotes the corresponding travel time for point 4.

When sweeping the image of the printed part, which can be considered as a single line without branching, naturally the two points 1 and 4 are on the same edge at the right side of the part, and the points 2 and 3 are on the edge at the left side of the printed part. Since the sweep travel speed is constant, the intervals of time $t_1$ to $t_4$ correspond to the respective angles $\theta_1$ to $\theta_4$ (FIG. 1*b*) which are interrelated as follows:

$$\left.\begin{aligned}\theta_1&=2\pi\frac{t_1}{T}\\ \theta_2&=2\pi\frac{t_2}{T}\\ \theta_3&=2\pi\frac{t_3}{T}\\ \theta_4&=2\pi\frac{t_4}{T}\end{aligned}\right\}\quad(1)$$

Assume that the two edges of the printed character are parallel. Then, for moving the center of the sweep circle parallel to both edges, the deflection angle of the sweeping beam may be controlled so that the center of the sweep circle will shift in the direction given by angle $\theta_5$ or $\theta'_5$ (FIG. 1*b*). These beam-shift control angles and directions are determined from $t_1$, $t_4$, or $t_2$, $t_3$ by the following formulas:

$$\left.\begin{aligned}\theta_5&=\frac{\theta_1+\theta_4}{2}-\frac{\pi}{2}=\frac{t_1+t_4}{T}\pi-\frac{\pi}{2}\\ \theta_5&=\frac{\theta_2+\theta_3}{2}-\frac{\pi}{2}=\frac{t_2+t_3}{T}\pi-\frac{\pi}{2}\end{aligned}\right\}\quad(2a)$$

$$\theta_5=\frac{\theta_1+\theta_2+\theta_3+\theta_4}{4}-\frac{\pi}{2}=\frac{t_1+t_2+t_3+t_4}{2T}\pi-\frac{\pi}{2}\quad(2b)$$

$$\left.\begin{aligned}\theta'_5&=\frac{\theta_1+\theta_4}{2}+\frac{\pi}{2}=\frac{t_1+t_4}{T}\pi+\frac{\pi}{2}\\ \theta'_5&=\frac{\theta_2+\theta_3}{2}+\frac{\pi}{2}=\frac{t_2+t_3}{T}\pi+\frac{\pi}{2}\\ \theta'_5&=\frac{\theta_1+\theta_2+\theta_3+\theta_4}{4}+\frac{\pi}{2}=\frac{t_1+t_2+t_3+t_4}{2T}\pi+\frac{\pi}{2}\end{aligned}\right\}\quad(2c)$$

If the printed part is not straight but curved, either $\theta_5$ or $\theta'_5$ changes gradually in accordance with the movement of the center of the sweep circle. In conformity with this change, the sweeping beam is caused to track along both edges of the printed part.

Figure 2:
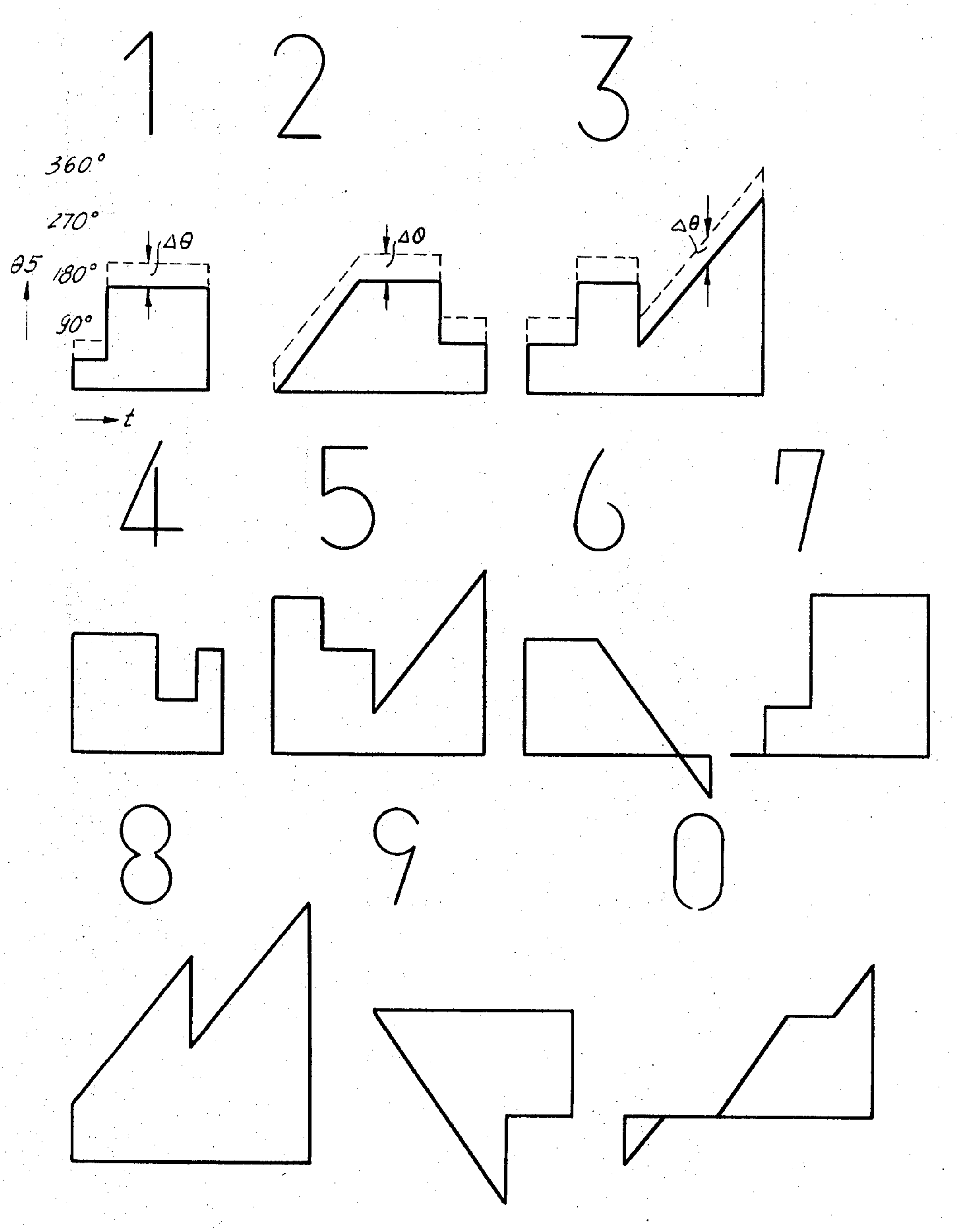

FIG. 2 exemplifies typical conditions for numerals "1" to "0" whose type shapes are composed of circular arcs and straight lines. The diagrams indicate the change of angle $\theta_5$ versus time *t*, effected when the above-mentioned tracking is performed at constant speed from the end portion of the printing.

In this case, the circular arc portion of the character pattern is given by a straight line at a certain inclination to the time axis *t*; and the straight portion of the character pattern is given by a straight line parallel to the time axis *t*, as will be understood from the foreging explanation. These timewise changes of the tracking angle $\theta_5$ show an analog waveform unique to the respective charters, so that each character can be recognized by identification of this waveform.

If the printed character is inclined from the normal condition, the analog pattern of angle $\theta_5$, shown by dotted lines in FIG. 2 for numerals 1, 2 and 3, merely undergoes parallel displacement by as much as the inclination $\Delta\theta$, so that the standard starting point of the character pattern scan is set, this point being at 90° for numeral 1 in the example of FIG. 2. This has no appreciable effect when the consideration is limited to the relative value of $\theta_5$. In the extreme case of an upside-down character, the recognition can still be preformed. Vertical displacement of a character has no effect at all.

For conversion of the waveform of $\theta_5$ to a digital signal, the voltage corresponding to the straight portion of the character and hence to the horizontal portion of the $\theta_5$ wave is extracted, and the difference from the voltage corresponding to $\theta_5$ at the start on the scan is detected. This voltage difference is applied to an analog-digital converter for conversion to a digital signal. For the circular arc portion of the character, the square wave form obtained by differentiating the voltage corresponding to $\theta_5$ is sent to the analog-digital converter for conversion to a digital signal. Thus, a digital signal corresponding to the straight and circular portions of the character can be obtained. This signal is arranged in the tracking sequence, and the resulting binary codes of a few bits or digits may be used to denote the recognized characters. For decimal indication, the patterns of FIG. 2 can also be denoted by relatively few digits. The results of the recognition are subsequently converted to a digital output signal.

The explanations given so far concern the recognition of perfect printing. In actual printing, the width of the printed characters is not constant due to varying inking condition, and the two edges are not accurately parallel. In the worst case, part of the printed character may be missing due to defective contrast or other defects. For recognition of such imperfect printing, the diameter of the sweep circle should exceed as much as possible the width of the printed character portions, thus minimizing the effect of variations in printing width. It is necessary to enlarge the sweep diameter each time such a variation is encountered, to determine whether the variation corresponds to a missing part or to an edge of the character.

Figure 3:
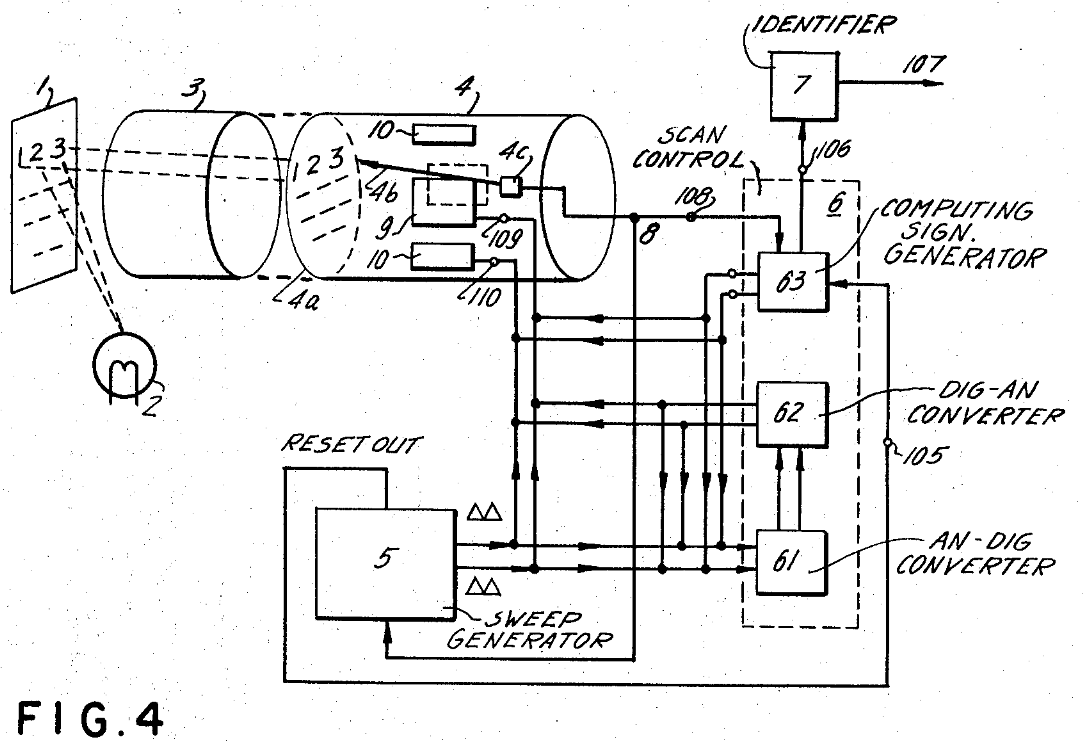
FIG. 3 illustrates schematically a character recognition system equipped with an optical-electrical scanner.

FIG. 3 shows an embodiment of an optical character recognition apparatus according to the invention. Denoted by 1 is the medium to be read out, namely a printed document sheet, which is illuminated from a light source 2. The scanner comprises an optical lens system 3 for projecting an image of the medium onto the planar image receiving plate 4*a* of the optical-electrical conversion tube 4 in which an electron beam 4*b* from an electron gun 4*c* is caused to scan an area element of the image plane on the plate 4*a*. The scanning sweep is produced and controlled by a sweep signal generator 5 and a sweep control unit 6, both connected to the horizontal deflector plates 9 and to the vertical deflector plates 10 of the tube 4. The output terminal 106 of the apparatus is connected to a character identifying unit 7.

The coarse sweep signal generator 5 generates a sweep signal, such as a sawtooth wave or sine wave, suitable for scanning the entire light-receiving surface of the image plate 4*a*. The generator 5 begins to sweep at the start of the recognition operation, and continues until the entire printed part of a character is scanned by the beam. Then the resultantly generated black level signal actuates the coarse sweep signal generator unit 5 to be reset and simultaneously sets the scan control unit 6. This control unit 6 is comprised of an analog-digital conversion unit 61 which converts the beam scanning signal of the sweep signal generator 5 into a digital quantity, a digital-analog conversion unit 62 which converts this signal back to an analog signal, and a signal computing and generating unit 63. While the units 5, 7 and the conversion units 61, 62 in control unit 6 are conventional and need not differ from equipment known for the respective subsidiary purposes, the computing signal generator 63 calls for particular logic circuits and is separately illustrated in FIGS. 4 and 5.

Unit 61 is essentially a counter. It converts the coarse scanning signal from generator 5 into a digital counting signal. When generator 5 has been reset by the detection of the printed part, the unit 61 maintains the value counted at the resetting moment of generator 5. Consequently, a scanning signal equivalent to that obtaining at the resetting moment of the sweep generator 5 is available as the output of the digital-analog converter unit 61, and the beam can thus be controlled to stop at the printed part. In effect, the converters 61 and 62 are both active in this manner as a memory of the place where the printed part is actually located.

The signal computing and generating unit 63 begins operation simultaneously with the reset out signal of the coarse sweep signal generator 5 appearing at the terminal 105 (FIGS. 3, 4), thus producing the signal required for the beam to perform circular scanning, the latter signal being superimposed on the output of the digital-analog converter 62. The resultant scanning output (at terminal 8 in FIG. 3) passes through terminal 108 (FIGS. 4, 5) to the unit 63 where the time $t_5$, corresponding to angle $\theta_5$, is computed and converted into a beam shift signal which controls the scanning beam to automatically track the configuration of the character to be recognized.

Figure 4:
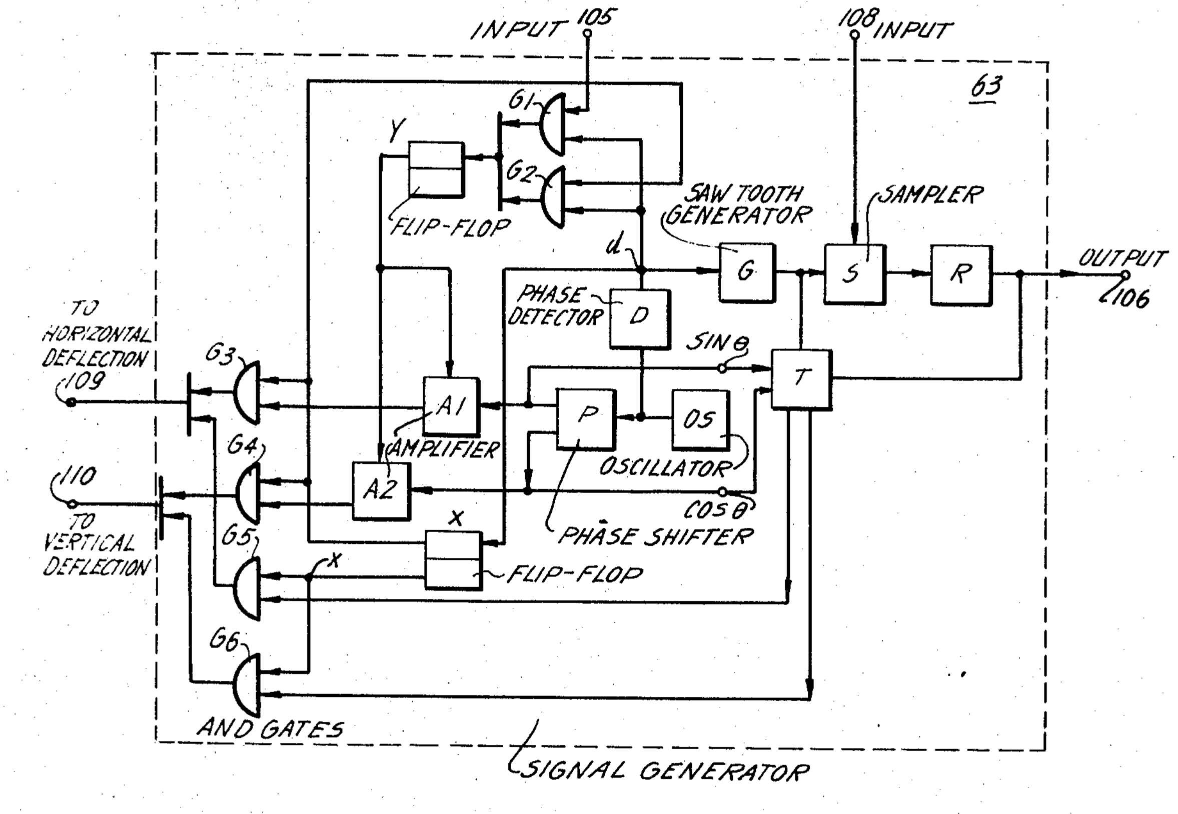
FIG. 4 shows separately the internal logic circuitry of a computing signal generator which forms part of the system shown in FIG. 3.

In the embodiment of a circuit system for performance of the tracking signal computation and generation shown in FIG. 4, a sine wave oscillator OS is connected to a phase shift circuit P and to a phase detecting circuit D. The system further comprises a sine wave amplifier $A_1$ and a cosine wave amplifier $A_2$, a sawtooth wave generator G, a sampling circuit S (FIG. 5), a resistive voltage divider circuit R (FIG. 5), a tracking deflection circuit T (FIG. 5), a counter circuit X such as a bistable multivibrator (flip-flop) and a switching circuit Y. Denoted by $G_1$ to $G_6$ are AND-gates. The terminals 105, 106, 108, 109, 110 in FIG. 4 correspond to those denoted in FIGS. 3 and 5 by the same respective reference numerals.

The sine wave oscillator OS and the phase shift circuit P in the tracking signal generator unit 63 generate two 90° phase displaced signals: a sine wave and a cosine wave. The sine and cosine wave signals are applied at respective terminals 109, 110 to the scanning beam horizontal deflector plates 9 and vertical deflector plates 10 of the optical-electrical conversion device 4, thus producing a circular sweep of the beam for every cycle of the sine wave. The start and termination of the sweep is timed by the sine-wave and cosine-wave amplifiers A1 and A2 being turned on and off under control by the switching circuit Y, preferably a flip-flop which is set or reset by the output signal (*d*) of the phase detecting circuit D and simultaneously by the resetting output signal from terminal 105 of the sweep generator 5 upon establishment of coincidence conditions at the AND-gate $G_1$. In this manner, the sine wave and cosine wave outputs are applied to the deflector plates from the starting point 0 (FIG. 1*b*) of the set phase, thus commencing a circular sweep, and these sine wave and cosine wave signals are turned off upon completion of one full cycle. As a result, the scanner output at terminal 108 (FIGS. 3, 4, 5) corresponds to the one exemplified by FIG. 1*c* and permits computing (in S, R, T) a control signal corresponding to the value $\theta_5$.

This, in the illustrated embodiment, is done as follows. The sawtooth wave generator G (FIGS. 4, 5) starts synchronously with the start of the circular sweep. The amplitude of the generated sawtooth voltage increases in proportion to the time lapse from the time of the starting moment of the sweep. This voltage is sampled by the sampling circuit S at the end of each interval $t_1$, $t_2$, $t_3$, and $t_4$ (FIG. 1*c*). The respective sampling output voltages are proportional to $t_1$, $t_2$, $t_3$, and $t_4$, or $\theta_1$, $\theta_2$, $\theta_3$ and $\theta_4$.

The sum of these four voltages is formed and divided by four. The voltage difference between the result of the division and the voltage obtained by sampling the same sawtooth wave at a position of 2/4 cycle after starting the sweep (namely the voltage corresponding to $\theta=\pi/2$), corresponds to $\theta_5$, as will be understood from Formula 2*b*.

A resistive voltage divider circuit R is provided for extracting the total voltage or difference of these voltages. The aforementioned sawtooth voltage is tapped at the voltage point corresponding to $\theta_5$, and the pulse from this tap point is applied for sampling the circular sweep sine wave and cosine wave, thus obtaining two voltages proportional to sin $\theta_5$ and cos $\theta_5$, respectively. These two voltages are applied to the vertical deflection plates 10 and the horizontal deflection plates 9, so that the beam is given a resultant deflection in the $\theta_5$ direction.

These operations are performed by the tracking deflector circuit T, consisting of slicing and sampling circuits, which will now be more fully described with reference to FIG. 5. The terminals indicated in FIG. 5 will facilitate recognizing how the illustrated components are combined with the other system components shown in FIGS. 3 and 4. Thus, the input terminals denoted in FIG. 5 by 108, *d*, *x* sin $\theta$ cos $\theta$ are connected to the respective circuit points denoted in FIG. 4 by the same reference characters; and this also applies to the output terminals 106, 109, 110.

The subsystem shown in FIG. 5 operates as follows:

Applied to terminal 018 is the scanner output signal which may correspond to the one shown in FIG. 1*c*. This signal is differentiated in a differentiator circuit 201, such as a capacitor circuit. As is well known, the differentiator circuit derives a peaked trigger pulse (201) from the voltage changes of the input signal. The positive or negative polarity of the trigger pulses depends upon whether the direction of the voltages is positive or negative. The trigger pulses (201) are rectified in a rectifier circuit 202 thus making all trigger pulses positive. The unidirectional pulses (202) are supplied to a four-digit shift register 203.

Ordinarily, as explained above, a wave train of pulses (202) contains four trigger pulses for each complete circular sweep. The register 203 is shifted in sequence by these four trigger pulses, and issues a corresponding time sequence of pulses at the four outputs ($t_1$), ($t_2$), ($t_3$), ($t_4$). The time points at which the shifts occur are $t_1$, $t_2$, $t_3$ and $t_4$ as shown in FIG. 1*c*.

Described presently is the operation subsequent to the shift register 203 reaching the fourth position. The shift register 203 issues the output signal $t_4$ in response to reception of a trigger pulse (201) at the end of the input signal (202). The signal $t_4$ is differentiated in a differentiating circuit 204 which issues the resulting peaked trigger pulse (204) to an AND-gate 205. At this time the sawtooth generator G is in operation, having been triggered by the signal from the terminal *d*, which latter signal is generated at the time point 0 (FIG. 1*b*) by means of the phase detector circuit D (FIG. 4). Consequently, the output pulse (204) of the differentiating circuit 204 opens the AND-gate 205 for a short interval of time. Thus, the sawtooth voltage of the timing point corresponding to $t_4$ passes through the AND-gate 205 and a diode 206 to charge a capacitor 207.

The charging voltage at capacitor 207 has a positive potential and is also applied to the base of an NPN-type transistor 208, thereby turning the transistor on. Since this transistor circuit is of the emitter-follower type, its emitter potential is roughly the same as the base potential.

The operaion just decribed for $t_4$ is analogously performed with respect to each other digit of the shift register 203. This is generally called a sampling operation. Accordingly, the voltage sampled at each timing point of $t_1$, $t_2$, $t_3$ and $t_4$ appears at the emitter circuit of the one transistor 208 corresponding to the particular digit.

The voltage thus obtained at each timing point $e\theta_1$, $e\theta_2$, $e\theta_3$ and $e\theta_4$, is applied as output to a resistor 209 of constant resistance. The four resistors 209 have respective terminals connected to a common output lead, so that the four voltage outputs are all combined with one another to a resultant voltage $e_0$ according to the formula:

$$e_0=\frac{e\theta_1+e\theta_2+e\theta_3+e\theta_4}{4}$$

In this manner, one term of the Formula 2*b* is computed. The output potential $e_0$ is applied at output terminal 106 to the identification unit 7 (FIG. 3) and can be used for the character identifying operation.

In order for the center of the scanning circle to shift parallel to the edges of the character, it is further necessary to provide for a voltage $$e\frac{\pi}{2}$$

which corresponds to $\theta=\pi/2$. For this purpose, the timing point ¼T of the sawtooth wave cycle T is sampled. In the circuit shown in FIG. 5, the trigger signal received at terminal *d* is applied to an AND-gate 219 through a time delay circuit 218 for delaying the signal by a time ¼T, thus sampling the sawtooth wave voltage at the timing point ¼T. The output of AND-gate 219 is connected through a diode 220 to a capacitor 211 and to the base of a transistor operating in the manner explained above with reference to items 206, 207 and 208.

The potential $$e\frac{\pi}{2}$$

detected by the sampling circuit 219, 220, 221 and 222, is applied to one of the two inputs of a differentiating amplifier circuit 210 whose other input is connected to terminal 106 to receive the voltage $e_0$ from the resistors 209. The amplifier 210 thus furnishes at its output 210' a voltage proportional to the difference between $$e_0 \text{ and } e\frac{\pi}{2}$$

thereby computing for Formula 2*b* the term:

$$e0=e_0-e\frac{\pi}{2}$$

The tracking unit T comprises a slicer 211 which has one input connected to amplifier 210 to receive the voltage $e\theta_5$, and which has another input connected to the sawtooth generator G to receive the voltage $\theta_G$. The output (211) of the slicer is applied to a differentiating circuit 212, thus obtaining the wave shape (212). This waveform is further differentiated for finally obtaining the spike wave (213). The positive spikes of the pulse wave (213) act to sample the voltage sin $\theta$ through an AND-gate 214S, diode 215S, capacitor 216S and transistor 217S. Analogously, the voltage cos $\theta$ is sampled by the negative spikes through the AND-gate 214C, diode 215C, capacitor 216C and transistor 217C.

The voltage passing through the AND-gate $G_5$ and output terminal 109 is applied to the horizontal deflection plates 9 (FIG. 3). The voltage passing through the AND-gate $G_6$ and output terminal 110 is applied to the vertical deflection plates 10. As a result, the system automatically performs the desired tracking along the printed part of the character line as explained with reference to FIGS. 1*a* to 1*c*.

For digital memory of the tracking point, a lead is to be connected to the output terminals 109 and 110 in order to apply the obtained deflection voltage to the analog-digital converter (FIG. 3).

Figure 5:
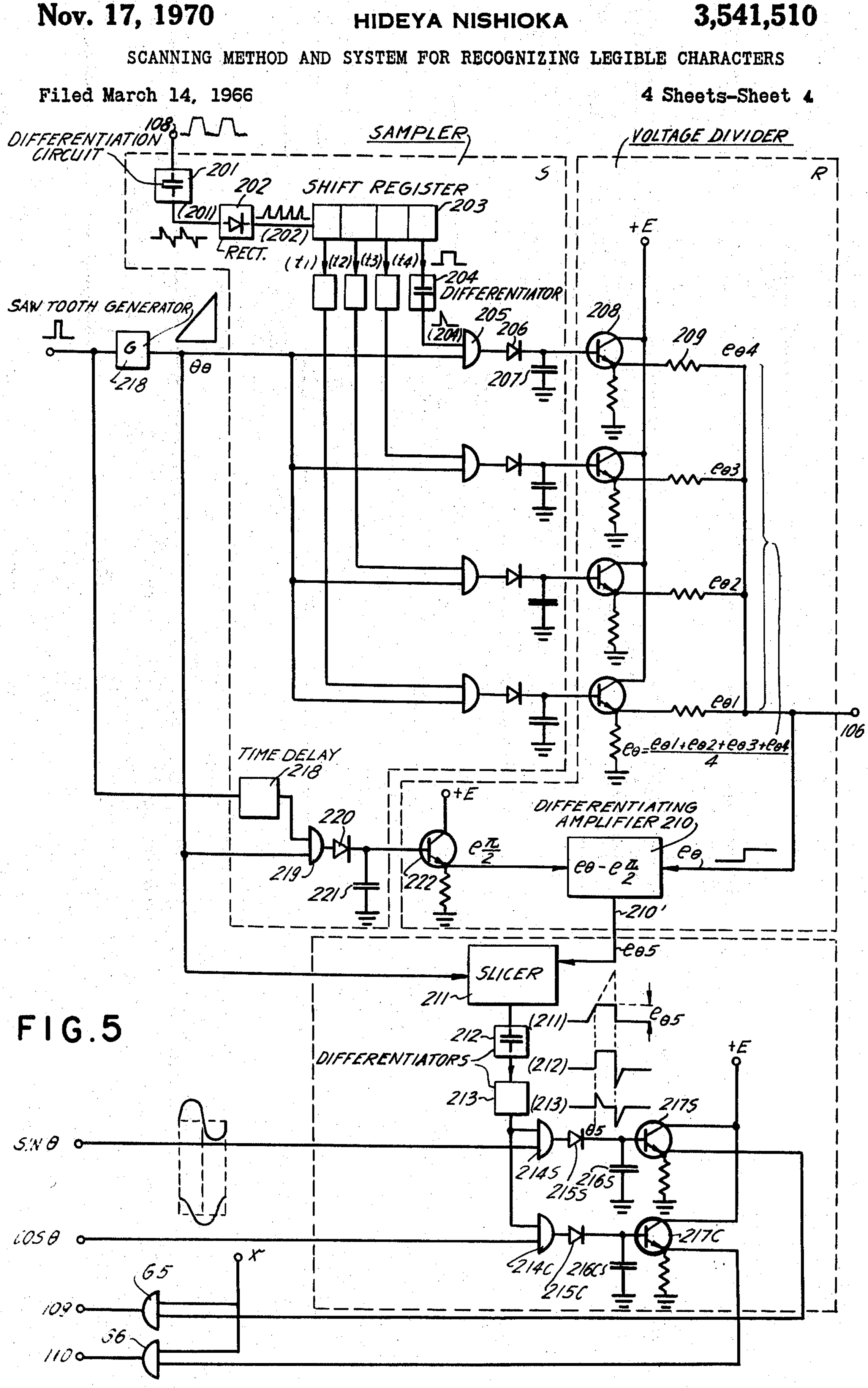
FIG. 5 is a more detailed circuit diagram of component assemblies which form part of the signal generator according to FIG. 4.

Omitted in the above explanation and in the circuit description shown in FIG. 5 are the wiring for discharging the capacitor charging voltage of each sampling circuit, as well as the wiring for clearing the shift register 203. Such auxiliary wiring is so universally conventional as to be self-understood without further description. If desired, however, reference in this respect may be had to the literature mentioned at the end of this specification.

To perform the operation described, the tracking deflection circuit T should be switched into operation at the scanning cycle following the completion of one circular sweep. This switching may be performed by having the counter circuit X (FIG. 4) switch the sine wave and cosine wave amplifiers $A_1$ and $A_2$ into alternate operation with the tracking deflection circuit T. Upon completion of a series of operations of circular scanning and tracking, the output signal of the digital-analog converter 62 and the tracking deflection signal are combined to a composite deflection output signal, which is sent to the analog-digital converter unit 61. Thus the tracking deflection signal is reset. Simultaneously, the digital-analog converter 62 is set by the output of 61, thus fixing the beam at the completion point of the tracking operation. The resetting output signal of the retracking deflection signal and the output signal of the phase detecting circuit D then simultaneously act at the AND-gate $G_2$, so that the circular sweep is again started, thereby commencing another cycle of operations. Upon determination of the tracking direction by the circular sweep in this manner, the tracking is performed for a certain set range. Upon completion of such tracking, the position then reached is used as a starting point for another determination of the subsequent tracking direction. This operation is repeated. When the tracking range at a time is set to be smaller than the total length of the character, an approximate tracking can be performed with a number of lines tangent to the type of printer characters. The smaller the tracking range for a given time, the more closely will the tracking path resemble the character pattern.

The tracking output signal at terminal 106, which is a voltage or current proportional to the tracking direction angle $\theta_5$, is applied to the identification unit 7. This tracking output signal represents a unique time pattern depending upon the characteristics of the circles and straight lines composing a character, as exemplified in FIG. 2. The identification unit 7 is used to convert this unique signal pattern into digital codes corresponding to various characters, by means of the analog-digital converter. This operation will be explained with reference to an example starting from one end of the character to be tracked, although it will be understood that tracking may be commenced from any other point of the printed character and in any direction. When arriving at one end, the tracking reverses for further tracking until the other end is reached.

With any such mode of operation, it is necessary to confirm that the end of the printed part has been reached. When this occurs, the intersections of the scanning circle with the printed part decrease from 4 points to 2 points. However, to avoid error due to imperfect printing, the diameter of the scanning circle is made large enough to permit a confirmation that a reduction in the number of intersection points is due to the operation of the tracking control unit.

Upon confirming that the end of the printed part has been reached, the phase of either the signal sine wave or the cosine wave for the circular scan is reversed, or the tracking direction is changed from $\theta_5$ to $\theta'_5$ or from $\theta'_5$ to $\theta_5$, thus permitting a reversal in tracking direction.

The diameter and circumference of the scanning circle may be easily increased by increasing the amplitude of the circular sweep signal.

In the case of a branched character pattern, the tracking direction upon encountering branching is set in accordance with a certain fixed condition, or the scanning circumference is increased for determination of the number of branches and the branching direction, thus performing tracking in a set direction. This function can be performed by the tracking control unit.

When there is an ink stain near the edge of the printed character, the diameter of the scanning circle may be decreased, thus avoiding the effect of the stain; the length of the printed part may be estimated from the tracking time for use as a reference for the recognition. This confirming function can be performed by the tracking control unit.

Most accurate tracking is secured if the center of the circular sweep is always positioned midway between the two edges of the printed part. This can be done by forming either $$\theta_5+\frac{\pi}{2} \text{ or } \theta_5'-\frac{\pi}{2}$$

by the above-described control means, and applying in this direction a deflection signal proportional to the product of the circular-scanning sine-wave amplitude times $$\cos\left(\frac{\theta_4-\theta_1+\theta_3-\theta_2}{4}\right)$$

The above-described tracking deflection circuit T (FIGS. 4, 5) is suitable for this performance.

While in the foregoing, reference is made only to a circular scanning sweep, the sweep may follow any other kind of closed loop formation, such as that of an oval 8-shape.

As mentioned, those circuit components that are shown in the accompanying drawings by a block diagram only, are well known as such and are commercially available for digital, analog or television techniques. Thus, with respect to the flip-flops X and Y, the shift register 203, and various other components, reference may be had, for example, to such textbooks as Computer Basics, vols. 4 and 6, published by Howard W. Sams & Co., Inc., New York; Millman and Taub, Pulse and Digital Circuits, McGraw-Hill Book Co., New York; and Microcircuit Handbook, published by The Fairchild Corporation of Mountain View, Calif. Suitable scanners and electronic accessory equipment are available, for example, from the manufacturers listed under "Optical Scanning" on pp. 52–54 in No. 10 of Computer Equipment Comparison Series, published by McGraw-Hill Publishing Co., Inc., New York. The character identifying output unit (7 in FIG. 3) also corresponds to those usually employed in other character identifying systems serving to detect coincidence between a pattern received and a reference pattern prepared in advance.

To those skilled in the art it will be obvious upon a study of this disclosure that my invention permits of a great variety of variations and may be given embodiments other than particularly illustrated and described herein, without departing from the essential features of my invention and within the scope of the claim annexed hereto.

I claim:

1. A scanning system for recognition of legible characters having continuous line portions, comprising a scanner for scanning a line element of a character to be recognized;

cyclical sweep control means connected to said scanner for controlling it to sweep a loop-shaped path of larger width than said character line element so that each individual sweep may pass across opposite edges of the character line portion whereby said scanner issues time-spaced black and white output signals; and tracking control means having an input connected to said scanner for response to said signals and having an output connected to said sweep control means to shift said loop-shaped sweep path along the line direction of the character to track the character, said tracking control means comprising a sampling unit connected to said scanner to receive up to four of said scanner output signals during each sweep cycle for providing respective four voltages indicative of the intervals of time elapsing from the starting moment of each sweep cycle to the moments of said respective four scanner output signals, a voltage adder and divider circuit connected to said sampling unit to form a first quantity ($e_0$) proportional to one quarter of the sum of said four voltages, analog circuit means for forming a second quantity ($e_{\pi/2}$) corresponding to $\pi/2$, and circuit means for arithmetically adding said first and second quantities to produce an output indicative of the tracking direction and connected to said sweep control means to effect shifting of said sweep path in said direction.

References Cited

UNITED STATES PATENTS

| | | | |
|---|---|---|---|
| 2,994,779 | 8/1961 | Brojillette | 340—146.3 XR |
| 3,004,166 | 10/1961 | Greene | 250—202 |
| 3,050,711 | 8/1962 | Harmon | 340—146.3 |
| 3,213,421 | 10/1965 | Abraham | 340—146.3 |
| 3,245,036 | 4/1966 | Grottrup | 250—202 XR |
| 3,248,699 | 4/1966 | Essinger et al. | 340—146.3 |
| 3,297,988 | 1/1967 | Greanias et al. | 340—146.3 |

MAYNARD R. WILBUR, Primary Examiner

L. H. BOUDREAU, Assistant Examiner